Dec. 18, 1934.                K. K. NAHIGYAN                1,984,690
GAS SCRUBBER
Filed Oct. 16, 1933

Inventor
KEVORK K. NAHIGYAN
By Albert G. Blodgett
Attorney

Patented Dec. 18, 1934

1,984,690

UNITED STATES PATENT OFFICE 1,984,690

GAS SCRUBBER

Kevork K. Nahigyan, Worcester, Mass., assignor to Riley Stoker Corporation, Worcester, Mass., a corporation of Massachusetts Application October 16, 1933, Serial No. 693,704

11 Claims. (Cl. 261—112)

This invention relates to gas scrubbers, and more particularly to scrubbers having deflecting members located in the path of the gases and supplied with water or other suitable liquid by gravity from an upper tank.

In gas scrubbers of this general type, it is the practice to distribute the water among the deflecting members by means of orifices, and it has been proposed heretofore to provide openings in the bottom of the tank and to close these openings by means of cover plates in which the distributing orifices are located. Considerable difficulty has been encountered in maintaining a tight seal between these cover plates and the tank bottom. Workmen frequently walk across the cover plates and shift them from their proper positions. Moreover the structures are often subjected to high temperatures from the gases, and to wide variations in temperature, all of which tends to loosen the plates and permit leakage between the plates and the bottom of the tank.

It is accordingly one object of the present invention to overcome these difficulties, and to provide a simple and inexpensive construction for a gas scrubber, including cover plates sealed to the bottom of a liquid tank and so arranged that they will remain firmly in position and prevent leakage under severe operating conditions.

It is a further object of the invention to provide a gas scrubber in which the liquid distributing cover plates may be readily installed or removed when desired, and in which all screwthreads or other machined surfaces likely to corrode are avoided.

It has been proposed heretofore to provide master orifices in the cover plates, and to install a small receptacle beneath each cover plate to receive the water delivered therethrough, each receptacle having a group of orifices to distribute the water over the surface of the deflecting member therebeneath. In the past, difficulty has been experienced in obtaining uniform and steady flow conditions through the orifices in the receptacles.

It is accordingly a further object of the invention to provide a gas scrubber of the master orifice type which will maintain a uniform and steady flow of liquid through the distributing orifices supplied by the master orifices.

It is a further object of the invention to provide a gas scrubber so constructed that the liquid will be properly directed and distributed over the surfaces of the deflecting members under all conditions.

With these and other objects in view, as will be apparent to those skilled in the art, the invention resides in the combination of parts set forth in the specification and covered by the claims appended hereto.

Referring to the drawing illustrating one embodiment of the invention, and in which like reference numerals indicate like parts, Fig. 1 is a longitudinal sectional elevation through the upper portion of a gas scrubber;

Figure 1:
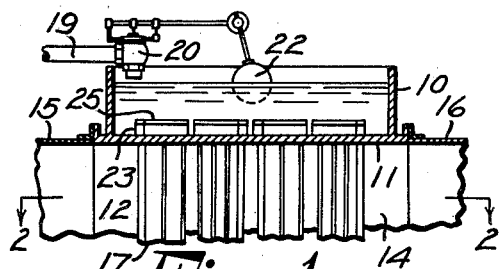
Figure 2:
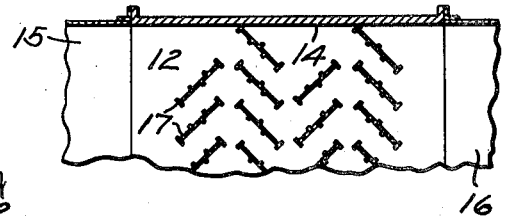
Fig. 2 is a partial section on the line 2—2 of Fig. 1.

In the drawing I have shown a gas scrubber of the general type disclosed in the application of Fred H. Daniels et al., Serial No. 608,716, filed May 2, 1932. The illustrated embodiment comprises a tank 10 having a flat horizontal bottom wall 11 which forms the upper wall of a gas passage 12. Vertical plates 14 form the side walls of this passage. An inlet duct 15 and an outlet duct 16 are connected to the passage 12, and a number of ribbed plates 17 are mounted in the passage to form deflecting surfaces in the path of the gases. These plates are preferably suspended with their upper portions in rectangular openings or slots 18 in the wall 11, and arranged at an angle to the general direction of the gas flow, as shown in Fig. 2. The tank 10 is supplied with a suitable liquid, such as water, from a pipe 19, and this pipe is shown provided with a valve 20 controlled by a float 22, which serves to maintain a substantially constant water level in the tank. Water from the tank is distributed over the surfaces of the plates 17, and the present invention is primarily concerned with the means for obtaining this distribution.

In order to distribute the water in the desired manner, I mount a cover plate 23 above each slot 18 and I provide a master orifice 24 in each cover plate to apportion the water among the deflecting plates. Each cover plate 23 is generally rectangular in plan and shaped as an inverted U in vertical cross-section, and for convenience in manufacture and assembly the upper wall portion 25 is made separable from the main body portion of the cover plate. The orifices 24 are formed in flanged ferrules 27 mounted in the wall portions 25.

The lower edges of the cover plates 23 are sealed to the tank bottom 11, and for this purpose the outer surfaces of the cover plates adjacent their lower edges are tapered at a slight angle and converge downwardly. The walls of the openings 18 in the tank bottom are also tapered at substantially the same angle in the upper portions of the openings. At assembly the lower edges of the cover plates 23 are inserted in the openings 18 with a resilient gasket 28 between each cover plate and the surrounding tapered wall of the opening. The cover plate is forced or driven into the opening, thus compressing the gasket and holding the cover plate firmly in place, while preventing all leakage of water. The gaskets 28 may be formed of any suitable material, such as asbestos impregnated with graphite. In the preferred construction, the upper wall portion 25 of each cover plate is sealed to the main body portion thereof in a similar manner by providing these parts with cooperating tapered surfaces between which there is inserted a gasket 30 similar to the gasket 28.

Figure 3:
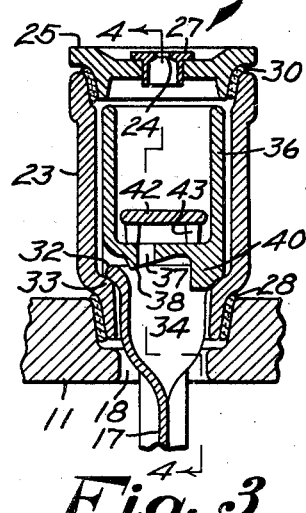
Fig. 3 is an enlarged view in section showing the means for distributing water to one of the deflecting plates, the section being taken on the line 3—3 of Fig. 4.
Figure 4:
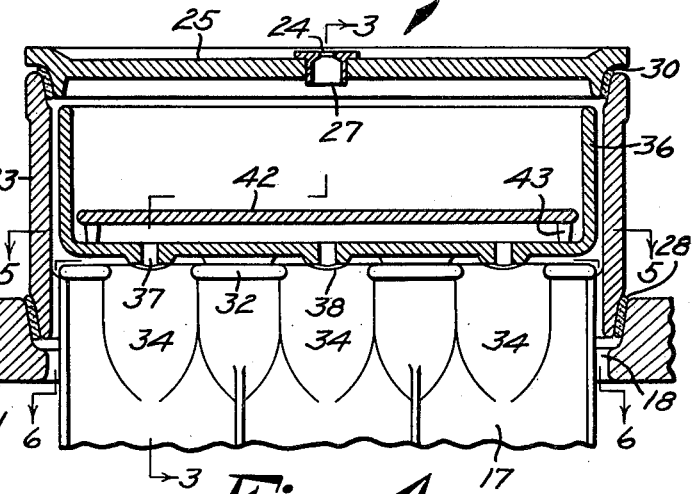
Fig. 4 is a section on the line 4—4 of Fig. 3.
Figure 5:
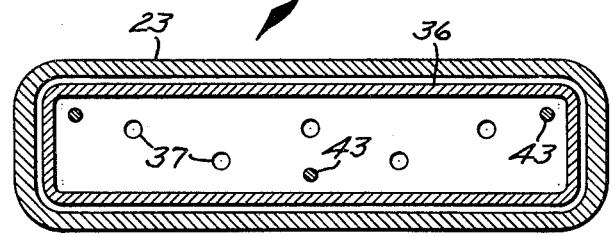
Fig. 5 is a section on the line 5—5 of Fig. 4.
Figure 6:
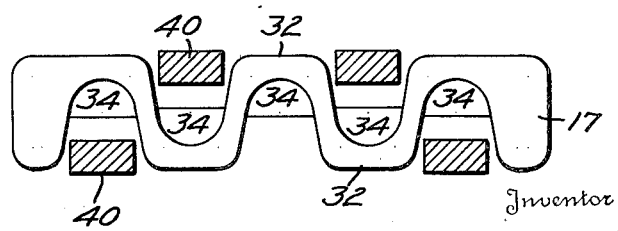
Fig. 6 is a section on the line 6—6 of Fig. 4.

In order to support the plates 17, I form their upper portions with flanges 32 which engage ledges 33 (Fig. 3) on the inner surfaces of the cover plates 23. The weight of the plates 17 is therefore transmitted to the cover plates and aids in holding them in place. The upper portion of each plate 17 is formed with pockets 34 in staggered arrangement which merge smoothly and gradually into the flat surface therebeneath, and the water delivered by the orifices 24 is distributed among these pockets. For this purpose I mount within each cover plate 23 a receptacle or trough 36 which is U-shaped in cross-section and arranged to receive the water from the orifice 24 thereabove, and I provide orifices 37 in the bottom wall of this receptacle to discharge jets of water directly into the pockets 34. A boss 38 is formed on the lower surface of the receptacle 36 around each of the orifices 37, and each boss slopes slightly downwardly toward the wall of the corresponding pocket, as shown particularly in Fig. 3. With this construction any water which may creep along the surface of the boss will eventually drop into the pocket rather than clear thereof. Each receptacle 36 is provided with downwardly projecting feet 40 which engage the ledges 33 and thus support the receptacle independently of the plate 17. If the plate 17 sways slightly, its motion will not be imparted to the receptacle.

I have discovered that the flow of water through the orifices 37 is sometimes unsteady and irregular as a result of turbulence in the water contained in the receptacles 36. In order to overcome this difficulty I mount within each receptacle a flat horizontal plate 42 which is slightly smaller in horizontal dimensions than the inside of the receptacle. Each plate 42 is provided with downwardly extending feet 43 which rest upon the bottom of the receptacle 36 and support the plate; leaving a space therebeneath in which the water will be protected from the impact of the jet delivered by the orifice 24.

The operation of the invention will now be apparent from the above disclosure. Water is supplied to the tank 10 through the pipe 19, and the water level in the tank is maintained substantially constant by means of the float 22 and the valve 20. The water flows through the master orifices 24 into the receptacles 36, and thence through the distributing orifices 37 into the pockets 34 in the plates 17. From these pockets the water spreads out in the form of a film flowing downwardly over the surfaces of the plates 17. Dust particles in the gases flowing through the passage 12 are collected by the water film and carried downwardly out of the gas stream.

The plates 42 prevent any substantial turbulence in the water beneath them, and as a result the flow through the distributing orifices 37 will be steady and uniform. Any water which may creep along the lower surfaces of the bosses 38 and away from the orifices 37 will eventually drop from the lowest point on each boss and directly into the pocket 34 therebeneath. The gaskets 28 and 30 provide tight and leak-proof joints which require no machined metal surfaces or expensive and complicated clamping devices. Because of the parallel slightly tapered surfaces in contact with the gaskets, the structure is braced very firmly against tipping or shifting by reason of lateral forces, and workmen may step on the upper wall plates 25 without causing any difficulty. The structure is simple and inexpensive, and it is very compact, so that the deflecting plates 17 may be placed comparatively near each other for effective cleaning of the gases. All parts can be easily removed or installed from the top of the gas scrubber.

Having thus described my invention, what I claim as new and desire to secure by Letters Patent is:

1. A gas scrubber comprising a tank for liquid mounted above a gas passage, said tank having a bottom wall provided with openings, deflecting members mounted in the gas passage, cover plates closing said openings and provided with orifices to distribute liquid among the deflecting members, the cover plates and the wall having cooperating slightly tapering surfaces, and gaskets located between said tapering surfaces and compressed by the wedging action as the cover plates are forced into place.

2. A gas scrubber comprising a tank for liquid mounted above a gas passage, said tank having a bottom wall provided with openings, deflecting members mounted in the gas passage, cover plates closing said openings and provided with orifices to distribute liquid among the deflecting members, the openings having inner surfaces which taper slightly in a downwardly converging direction and the cover plates having outer surfaces which likewise taper slightly in a downwardly converging direction, and gaskets located between said tapering surfaces and compressed by the wedging action as the cover plates are forced into place.

3. A gas scrubber comprising a tank for liquid having a horizontal bottom wall forming the upper wall of a gas passage, said wall having openings therein, deflecting members mounted in the gas passage with their upper portions in the openings, cover plates closing the openings and shaped as an inverted U in cross-section, the openings having inner surfaces which taper slightly in a downwardly converging direction and the lower portions of the cover plates having outer surfaces which likewise taper slightly in a downwardly converging direction, and gaskets located between said tapering surfaces and compressed by the wedging action as the cover plates are forced into place, the cover plates having orifices to distribute liquid among the deflecting members.

4. A gas scrubber comprising a tank for liquid having a horizontal bottom wall forming the upper wall of a gas passage, said wall having openings therein, cover plates closing the openings and shaped as an inverted U in cross-section, the openings having inner surfaces which taper slightly in a downwardly converging direction and the lower portions of the cover plates having outer surfaces which likewise taper slightly in a downwardly converging direction, gaskets located between said tapering surfaces and compressed by the wedging action as the cover plates are forced into place, ledges on the inner surfaces of the cover plates, and deflecting plates mounted in the gas passage and having flanges at their upper ends which engage said ledges to support the plates, the cover plates having orifices to distribute liquid among the deflecting plates.

5. A gas scrubber comprising a tank for liquid having a horizontal bottom wall forming the upper wall of a gas passage, said wall having openings therein, cover plates closing the openings and shaped as an inverted U in cross-section, the openings having inner surfaces which taper slightly in a downwardly converging direction and the lower portions of the cover plates having outer surfaces which likewise taper slightly in a downwardly converging direction, gaskets located between said tapering surfaces and compressed by the wedging action as the cover plates are forced into place, ledges on the inner surfaces of the cover plates, and deflecting plates mounted in the gas passage and having flanges at their upper ends which engage said ledges to support the plates, the upper wall portions of the cover plates being separable from the main body portions of the cover plates, and said upper wall portions having orifices to distribute liquid among the deflecting plates.

6. A gas scrubber comprising a tank for liquid having a horizontal bottom wall forming the upper wall of a gas passage, said wall having openings therein, cover plates closing the openings and shaped as an inverted U in cross-section, the openings having inner surfaces which taper slightly in a downwardly converging direction and the lower portions of the cover plates having outer surfaces which likewise taper slightly in a downwardly converging direction, gaskets located between said tapering surfaces and compressed by the wedging action as the cover plates are forced into place, ledges on the inner surfaces of the cover plates, deflecting plates mounted in the gas passage and having flanges at their upper ends which engage said ledges to support the plates, and receptacles mounted within the cover plates and supported by the ledges, each receptacle having a group of orifices to distribute liquid over the surface of the adjacent deflecting plate, and the cover plates having orifices to distribute liquid among the receptacles.

7. A gas scrubber comprising a tank for liquid having a horizontal bottom wall forming the upper wall of a gas passage, said wall having openings therein, deflecting members mounted in the gas passage, cover plates closing the openings and shaped as an inverted U in cross-section, the lower edges of the cover plates being sealed to said bottom wall around the openings, and the upper wall portions of the cover plates being separable from the main body portions of the cover plates, said upper wall portions and main body portions having cooperating slightly tapering surfaces, and gaskets located between said tapering surfaces and compressed by the wedging action as the parts are assembled, the upper wall portions having orifices to distribute liquid among the deflecting members.

8. A gas scrubber comprising a tank for liquid mounted above a gas passage, deflecting members mounted in the gas passage, a plurality of comparatively small receptacles mounted above the deflecting members and each provided with a series of distributing orifices through which liquid flows to the deflecting members, means providing a master orifice for each receptacle to control the flow of liquid thereto from the tank, and means associated with each receptacle to prevent turbulence in the liquid therein.

9. A gas scrubber comprising a tank for liquid mounted above a gas passage, deflecting members mounted in the gas passage, receptacles mounted above the deflecting members, the bottom of each receptacle being provided with a group of orifices arranged to distribute liquid to the deflecting member therethrough, means providing a master orifice arranged to deliver liquid from the tank to each receptacle, and a substantially horizontal plate in each receptacle to prevent turbulence in the liquid beneath said plate.

10. A gas scrubber comprising a tank for liquid mounted above a gas passage, said tank having a bottom wall provided with openings, deflecting members mounted in the gas passage, receptacles mounted above the deflecting members and each having orifices in its bottom wall to distribute liquid to the deflecting member therethrough, a cover plate mounted over each receptacle and sealed to the bottom wall of the tank, each cover plate having a master orifice to deliver liquid from the tank to the receptacle, and a substantially horizontal plate in each receptacle to receive the impact of the jet from the master orifice and prevent turbulence in the liquid beneath the plate.

11. A gas scrubber comprising a tank for liquid mounted above a gas passage, said tank having a bottom wall provided with openings, having openings therein, deflecting plates mounted in the gas passage with their upper ends adjacent said openings, the upper ends of the deflecting plates having pockets which merge smoothly and gradually into the surface of the plate therebeneath, means providing orifices above the pockets which direct jets of liquid downwardly into the pockets, and bosses surrounding the orifices on the lower side thereof, the bosses sloping slightly downwardly toward the wall of the corresponding pockets.

KEVORK K. NAHIGYAN.

CERTIFICATE OF CORRECTION.

Patent No. 1,984,690.  December 18, 1934.

KEVORK K. NAHIGYAN.

It is hereby certified that error appears in the printed specification of the above numbered patent requiring correction as follows: Page 3, second column, lines 28 and 39, claims 9 and 10 respectively, for "therethrough" read therebeneath; and same column, lines 50 and 51, claim 11, strike out the words "having openings therein"; and that the said Letters Patent should be read with these corrections therein that the same may conform to the record of the case in the Patent Office.

Signed and sealed this 19th day of February, A. D. 1935.

Leslie Frazer (Seal)  Acting Commissioner of Patents.